(12) United States Patent
Le Nerriec et al.

(10) Patent No.: US 10,097,874 B2
(45) Date of Patent: Oct. 9, 2018

(54) SYSTEM AND METHOD FOR MONITORING MEDIA STREAM BUFFERS OF MEDIA OUTPUT DEVICES IN ORDER TO SYNCHRONIZE MEDIA CONTENT OUTPUT

(71) Applicant: QUALCOMM Incorporated, San Diego, CA (US)

(72) Inventors: Johan Le Nerriec, San Francisco, CA (US); Jehan Gerard Bing, Menlo Park, CA (US); Judah John Menter, Austin, TX (US); Craig Furman, Oakland, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 14/600,685

(22) Filed: Jan. 20, 2015

(65) Prior Publication Data

US 2015/0381343 A1    Dec. 31, 2015

Related U.S. Application Data

(60) Provisional application No. 62/018,494, filed on Jun. 27, 2014.

(51) Int. Cl.
| | |
|---|---|
| *H04W 4/06* | (2009.01) |
| *H04N 21/41* | (2011.01) |
| *H04L 12/761* | (2013.01) |
| *H04L 12/26* | (2006.01) |
| *H04N 21/43* | (2011.01) |

(Continued)

(52) U.S. Cl.
CPC ......... *H04N 21/4104* (2013.01); *H04L 43/16* (2013.01); *H04L 45/16* (2013.01); *H04N 21/4302* (2013.01); *H04N 21/4305* (2013.01); *H04N 21/4307* (2013.01); *H04N 21/439* (2013.01); *H04N 21/4398* (2013.01); *H04N 21/43637* (2013.01); *H04L 43/08* (2013.01)

(58) Field of Classification Search
CPC ........ H04W 4/06; H04W 88/08; H04W 76/00
See application file for complete search history.

(56) References Cited

U.S. PATENT DOCUMENTS

| | | |
|---|---|---|
| 7,590,752 B2 * | 9/2009 | van Oldenborgh .......................... G08G 1/096791 709/201 |
| 7,805,210 B2 | 9/2010 | Cucos et al. |

(Continued)

OTHER PUBLICATIONS

Imagination Technologies: "An Introduction to Caskeid—Wireless Stream Synchronisation IP," Retrieved on Aug. 5, 2014, pp. 7, Retrieved from URL : http://www.design-reuse.com/articles/33326/wireless-stream-synchronisation-ip.html.

*Primary Examiner* — Lonnie Sweet
*Assistant Examiner* — Prenell Jones
(74) *Attorney, Agent, or Firm* — Paradice and Li LLP

(57) ABSTRACT

A controller output device monitors a media stream buffer on each of multiple receiver output devices. The controller output device determines, at a given instance of time, a buffer data size value of the media stream buffer on each of the receiver output devices. Additionally, the controller output device determines a playback state and a buffer state of one or more of the receiver output devices at the given instance of time, based on the buffer data size values of the media stream buffer of each of the one or more receiver output devices.

20 Claims, 10 Drawing Sheets

(51) Int. Cl.
*H04N 21/439* (2011.01)
*H04N 21/4363* (2011.01)

(56) References Cited

U.S. PATENT DOCUMENTS

| | | | | |
|---|---|---|---|---|
| 8,185,088 | B2* | 5/2012 | Klein | H04M 15/00 455/406 |
| 8,346,605 | B2* | 1/2013 | Krikorian | G06Q 30/0273 705/14.49 |
| 8,681,822 | B2 | 3/2014 | Bradley et al. | |
| 8,750,264 | B2* | 6/2014 | Shatti | H04B 7/026 370/338 |
| 8,971,210 | B1* | 3/2015 | Murali | H04B 7/0413 370/254 |
| 9,332,160 | B1* | 5/2016 | Chenillo | H04L 29/06 |
| 2002/0118689 | A1* | 8/2002 | Luijten | H04L 47/2441 370/411 |
| 2002/0198905 | A1* | 12/2002 | Tabatabai | H04N 21/23412 715/201 |
| 2003/0067872 | A1* | 4/2003 | Harrell | H04L 29/06027 370/229 |
| 2006/0002681 | A1* | 1/2006 | Spilo | H04N 5/76 386/220 |
| 2006/0149850 | A1* | 7/2006 | Bowman | G11B 27/10 709/231 |
| 2008/0008281 | A1* | 1/2008 | Abrol | G10L 21/01 375/359 |
| 2008/0034041 | A1 | 2/2008 | Kang et al. | |
| 2009/0298420 | A1 | 12/2009 | Haartsen et al. | |
| 2010/0182920 | A1* | 7/2010 | Matsuoka | H04L 43/00 370/252 |
| 2010/0191525 | A1* | 7/2010 | Rabenko | H04B 3/23 704/211 |
| 2011/0086611 | A1* | 4/2011 | Klein | H04M 15/00 455/407 |
| 2011/0196918 | A1 | 8/2011 | Kkunigita et al. | |
| 2012/0150961 | A1* | 6/2012 | Shatsky | H04L 65/80 709/204 |
| 2012/0207225 | A1* | 8/2012 | Jeong | H04N 21/242 375/240.25 |
| 2012/0297405 | A1 | 11/2012 | Zhang et al. | |
| 2012/0324520 | A1* | 12/2012 | Van Deventer | H04L 65/605 725/109 |
| 2013/0208587 | A1* | 8/2013 | Bala | H04W 16/14 370/230 |
| 2013/0275611 | A1* | 10/2013 | Somekh | H04N 21/251 709/231 |
| 2014/0010515 | A1 | 1/2014 | Lee et al. | |
| 2014/0177864 | A1 | 6/2014 | Kidron | |
| 2015/0382050 | A1 | 12/2015 | Le Nerriec | |

\* cited by examiner

SYSTEM AND METHOD FOR MONITORING MEDIA STREAM BUFFERS OF MEDIA OUTPUT DEVICES IN ORDER TO SYNCHRONIZE MEDIA CONTENT OUTPUT

RELATED APPLICATIONS

This application is a non-provisional filing and claims the benefit of U.S. Provisional Patent Application Ser. No. 62/018,494, filed Jun. 27, 2014, entitled "System and Method for Synchronizing Speakers Connected on a Network", which application is fully incorporated herein by reference.

BACKGROUND

Audio systems exist that utilize network connected audio output devices (e.g., speakers). In such systems, multiple connected speakers can be used to output the same content.

DETAILED DESCRIPTION

Figure 1:
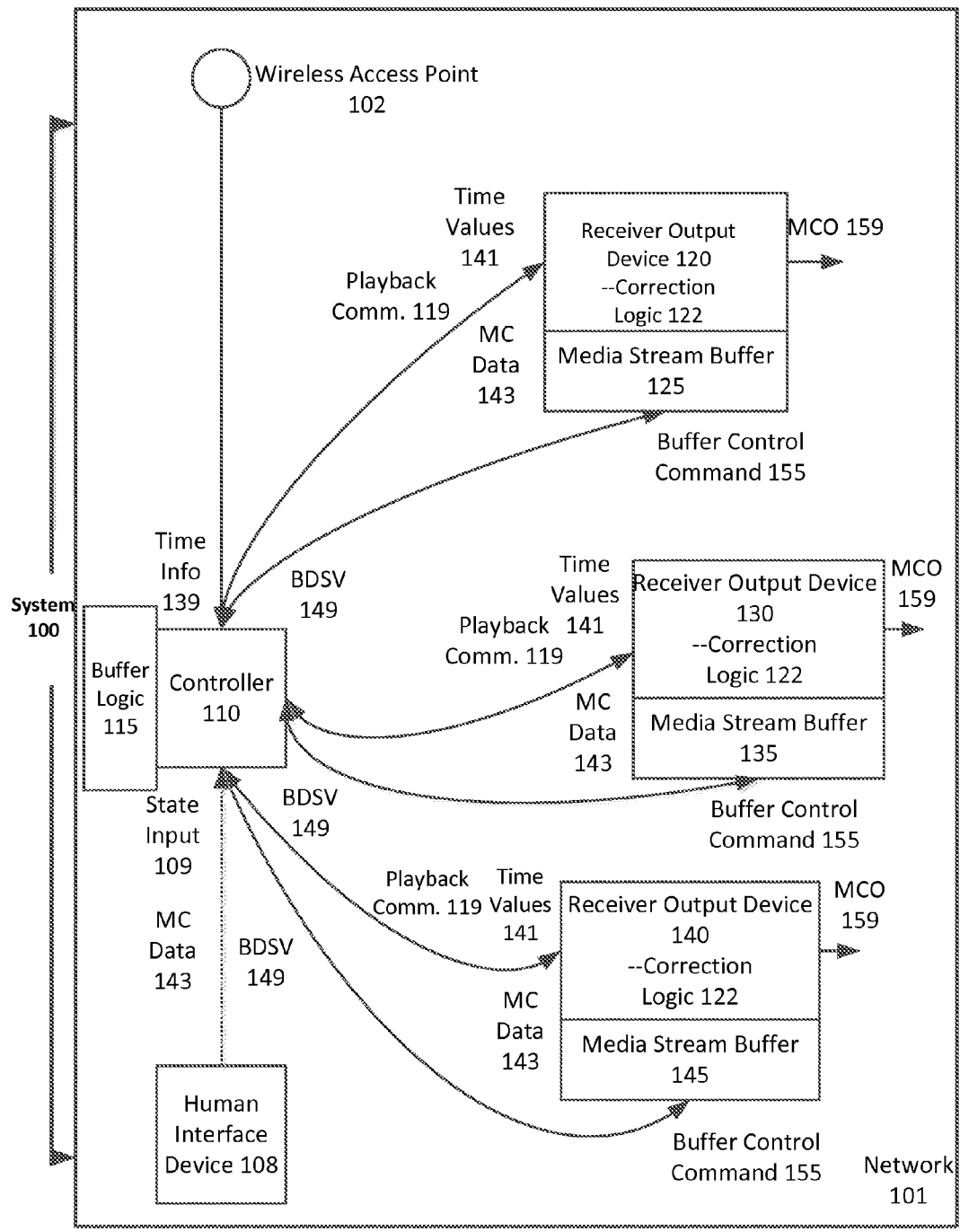
FIG. 1 illustrates an example system for outputting content using a wireless network, according to various embodiments.

Embodiments described herein provide for a connected media environment in which multiple network-connected media output devices combine to provide a common content experience to the user in a time synchronized fashion. Specifically, embodiments recognize that when a multimedia stream is played back on multiple network-connected output devices (e.g., speakers) at the same time, the output devices have a tendency to become out-of-sync as a result of each device utilizing a separate internal clock. Accordingly, various embodiments provide for a network-connected output device that is configured to (i) identify when the output device is out-of-sync in terms of playing back content with another audio output device, and (ii) take corrective action so that the output device becomes synchronized when playing back the content with the other output device.

According to various embodiments, a media output device operates to receive media content data for a content item. The media content data can be communicated from another device over a network. The speaker generates a media content output for the content item based on the media content data. While receiving the media content data, the receiver output device determines an instance of time that is synchronized to an external clock reference. The receiver output device also determines output correction to perform based at least in part on the synchronized instance of time. The receiver output device adjusts the media content output to include the output correction(s).

In various embodiments, a controller output device operates to synchronize network media content. The controller output device communicates with a set of multiple receiver output devices that are connected to a network to generate media content output. The controller output device monitors, from over the network, a media stream buffer on each of the output devices of the set. The controller output device monitors the media stream buffers of the receiver output devices by determining, at a given instance of time, a buffer data size value of the media stream buffer on each of the receiver output devices. A buffer state of one or more of the receiver output devices at the given instance of time is determined, based on the buffer data size values of the media stream buffer for each of the one or more receiver output devices.

Still further, various embodiments provide for a controller output device for a set of output devices on a network. The controller output device operates to receive media content data for a content item, and to generate a media content output for the content item based on the media content data. While receiving the media content data, the controller output device determines an instance of time that is synchronized to an external clock reference. The controller output device determines an output correction based at least in part on the synchronized instance of time. The controller output device adjusts the media content output to include the output correction.

In various embodiments, a controller output device communicates with a set of multiple receiver output devices that are connected to a network to generate media content output. The controller output device monitors a media stream buffer on each of the receiver output devices. The controller output device determines, at a given instance of time, a buffer data size value of the media stream buffer on each of the receiver output devices. Additionally, the controller output device determines a playback state and a buffer state of one or more of the receiver output devices at the given instance of time, based on the buffer data size values of the media stream buffer of each of the one or more receiver output devices.

As used herein, a speaker is intended to mean an audio output device, such as a network-connected audio output device. One example of a speaker includes a dedicated device that outputs audio, such as music. Another non-limiting example of a speaker includes a multifunctional device, such as a mobile device or tablet, which can output video, capture and store audio content, enable user interaction and/or perform numerous other actions.

In various embodiments, an output device outputs audio content that is received over a network. The output device determines a synchronized instance of time from a clock reference. The output device plays back the content while enforcing the output of the content to be synchronized relative to the synchronized instance of time. In particular, the output device implements one or more output corrections in order for output of a given media content data packet to be synchronized relative to the synchronized instance of time.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example system 100 for outputting synchronized media content over a network, according to various embodiments. The system 100 includes a controller output device 110, and one or more receiver output devices 120, 130, 140. Additionally, the system 100 can include a human interface device 108, such as a mobile computing device (e.g., smartphone, tablet or hybrid device, wearable computing device, etc.). For purpose of illustration, an example of FIG. 1 illustrates the use of four output devices. In variations, more or fewer output devices can be incorporated in a manner described. Still further, an example of FIG. 1 is shown as being implemented in a local network 101 having a wireless access point 102. The output devices 110, 120, 130, 140 can be directly (e.g., via wireless peer-to-peer connection) or indirectly connected (e.g., via the access point 102). Each of the output devices 110, 120, 130 and 140 are connected on the wireless network through use of one or more wireless connections, such as provided by any one of the 802.11 IEEE standards (e.g., 802.11(a), 802.11(b), 802.11(g), 802.11(n), etc.)(collectively "Wi-Fi"). Still further, in some implementations, some or all of the output devices 110, 120, 130, and 140 are capable of wireless peer-to-peer communications, such as provided by Wi-Fi Direct. Still further, in some implementations, the network that interconnects the output devices can correspond to a wired network.

In various embodiments, the output devices 110, 120, 130, 140 utilize or share an application framework or protocol in which individual output devices are aware of one another, and further can communicate with one another over the wireless network. In some variations, the output devices 110, 120, 130, 140 are configured to be aware of each other's capabilities or functionality, connectivity status, and/or availability. Additionally, the human interface device 108 can communicate with each of the output devices 110, 120, 130, and 140, and further determine and be aware of each output device's capability, functionality, connectivity status, and/or availability.

In an example of FIG. 1, the output devices 110, 120, 130 and 140 output audio content. In variations, the output devices 110, 120, 130 and 140 output video content. Still further, some embodiments provide for the output devices to include a combination of audio and video devices. For example, in FIG. 1, the output devices 110, 120, 130 and 140 can include a television (video device) and multiple speakers (audio devices). Each output device can generate output (audio or video) from a common source. As described by various examples, the output devices 110, 120, 130, 140 can operate to output content in a connected environment, with the content output being synchronized and continuously corrected to remain synchronized. Additionally, in some embodiments, the system 100 can be implemented with control functionality that monitors for each output device to have a synchronized playback state, as well as sufficient buffering capacity to maintain output without data failure (e.g., sputtering). Throughout the examples provided, the term "media" in the context of media output devices 110, 120, 130, 140 (e.g., "outputting media") is intended to be either audio or video (or both).

In some embodiments, the controller output device (e.g., 110) can be selected as the "controller" based on a variety of factors, such as capability, protocol, randomness, user or manufacture designation, network performance, a variety of static or dynamic factors, or other criteria. In some embodiments, the controller output device 110 transmits media content ("MC") data 143 to the other output devices (referred to as "receiver output devices") 120, 130, and 140. In particular, the controller output device 110 can stream media content data 143 to the individual other output devices 120, 130, 140. The controller output device 110 can obtain the media content data 143 being streamed from a variety of sources, including internal resources such as memory, or external sources such as human interface device 108. As another example, the controller output device 110 can obtain the media content data 143 from a third-party network service (Internet radio or streaming service). Accordingly, the controller output device 110 can include one or more receivers for receiving streams of media content data 143 from another source (e.g., connected computer or network streaming source).

In variations, the system 100 outputs media using alternative audio distribution schemes. For example, in some implementations, each output device 110, 120, 130 and 140 receives the media content data 143 from the human interface device 108. The use of a particular audio distribution scheme can be modally implemented and determined based on preference or network connection parameters. For example, a media distribution scheme in which one output device acts as the "controller" by transmitting media content data 143 to the other output devices generally requires less network bandwidth than a media distribution scheme in which the media content data 143 is communicated to each of the output devices 110, 120, 130, 140.

Playback State Control

In an example of FIG. 1, each output device 110, 120, 130, 140 is associated with defined states, including a playback state and a buffer state. The playback state of each output device 110, 120, 130, 140 can identify the media being output, as well as whether the media that is being output is being played or paused. The controller output device 110 and/or individual output devices 120, 130 140 operate to maintain synchronicity amongst the devices as to the playback state, including the particular media output, and whether the playback is paused or being played. Additionally, the controller output device 110 and/or individual output devices 120, 130 140 operate to maintain synchronicity amongst the timing of the output from each media output device, particularly as to when the timing of the outputs from the respective output devices 110, 120, 130, 140 becomes discernible to a user.

In some embodiments, the controller output device 110 synchronizes the playback state amongst the various output devices 110, 120, 130, 140. The playback state can be altered by state input 109 provided through the human interface device 108. For example, the state input 109 can specify a pause or stop command, or a selection of a particular content for playback. In response to receiving the state input 109, the controller output device 110 can communicate a playback command 119 to each of the other output devices 120, 130, 140. In some embodiments, each output device 110, 120, 130, 140 is synchronized to a common master clock, and the communication of the playback command 119 results in each output device 110, 120, 130, 140 implementing the command (e.g., pause) at the same time. In a variation, the playback command 119 itself can be associated with a timestamp that indicates when the playback command 119 is to be implemented on each receiver output device 120, 130, 140. For example, if the playback command 119 specifies a track selection, then implementation of the playback command 119 is synchronized in time so that each output device 110, 120, 130, 140 initiates playback of the new track at the same time. To this end, and as described below, each output device 120, 130, 140 can determine a reference or master clock from input of the controller output device 110. The reference or master clock can be used to ensure that the playback command 119 is implemented on each of the output devices 110, 120, 130, 140 at the same time, and in synchronized fashion.

Synchronized Output

In order to maintain synchronicity in timing among the output devices 110, 120, 130, 140, each output device 120, 130, and 140 (including output device 110 when human interface device 108 acts as the controller) can implement operations to synchronize itself with an external clock reference. In some embodiments, the external clock reference is provided by the controller output device 110. In a variation, the external clock reference is provided by still another network resource.

With further reference to an example of FIG. 1, the controller output device 110 may be configured to (i) transmit the media content data 143 to each of the receiver output devices 120, 130, 140, and (ii) provide an external time reference by communicating time values 141 to each of the receiver output devices 120, 130, 140. As described in greater detail, the time values 141 enable each of the receiver output devices 120, 130, 140 to determine a master or reference clock for synchronization with their respective internal clocks. The media content data 143 can include timestamps indicating when content is to occur. When each of the output devices 110, 120, 130, 140 are synchronized to the master clock, the timestamps provided with the individual frames of the media content data 143 ensures playback of the individual frames occurs at the same time. In this way, the synchronization to a reference or master clock enables the output devices 110, 120 130, 140 of the system 100 to collectively maintain the same clock when outputting the media content frames. Furthermore, as described in greater detail below, the synchronization to the master clock enables corrective measures to be taken as needed to correct the timing of individual output devices, so that synchronized output of the media content data 143 is maintained. The individual output devices 110, 120, 130, 140 can be corrected for drift over time using the time values 141 to provide a reference clock that trues the internal clock of the respective output device 110, 120, 130, 140.

In some embodiments, the time values 141 (representing the master clock) can be determined from local or network resources. For example, the controller output device 110 can obtain a reference time signal from an operating system or hardware component of the controller output device 110 or network-connected computer. In other variations, the time values can be determined from information provided from the wireless access point 102. In particular, examples recognize that wireless communication protocols, such as those promoted under the various Wi-Fi standards maintain accurate time information 139 (e.g., TSF Timer as described below) at the access point 102. In some variations such as shown by an example of FIG. 1, the controller output device 110 obtains time information 139 from the wireless access point 102 and communicates the information to the other output devices 120, 130, 140 as time values 141. In other variations, each output device 110, 120, 130 and 140 can obtain time information 139 for maintaining synchronized output directly from the access point 102.

When synchronized to the master clock, each output device 110, 120, 130, 140 generates media content output 159 (e.g., music, audio track from audio/video programming) in a synchronized fashion. The output devices 110, 120, 130, 140 can be arranged so that they each generate media content output 159 in a given region of space covered by the network 101. Various arrangements and layouts can be employed in order to enhance or optimize the media consumption experience for the user.

Additionally, each of the output devices 110, 120, 130, 140 can include correction logic 122. The correction logic 122 enables each output device 110, 120, 130, 140 to make its own determination of whether correction is needed when that output device is outputting media for a shared content item (e.g., song). On each output device 110, 120, 130, 140, the correction logic 122 executes to detect when the difference between the timestamp of individual frames in the media content data 143 and the master clock maintained by that device exceeds a predetermined threshold. When the threshold is achieved on a given output device in regards to a difference between (i) a timestamp of individual frames in media content data 143 being output on a given device, and (ii) the master clock, then the given output device is said to have drifted.

According to some aspects, the individual output devices 110, 120, 130, 140 are configured to implement corrective actions in order to correct for drift and to maintain synchronicity of output when outputting media content from a common source. In some embodiments, each of the output devices 110, 120, 130, 140 can implement the correction logic 122 in order to take corrective action in terms of when media content output 159 is generated from the other output devices 120, 130, 140. By taking corrective action, each output device 110, 120, 130, 140 can maintain synchronicity while playing back the media content. The corrective actions of each output device 110, 120, 130, 140 can affect the generation of media content output 159 on that output device. However, the affects can be non-discernible to a user. The correction actions can cause the implementing output device to momentarily slow down or speed up its output. By way of example, for audio output, the correction logic 122 can trigger individual output devices 110, 120, 130, 140 to skip or duplicate audio frames to adjust playback time as compared to the reference time provided from the time values 141. For video, the correction logic 122 can trigger individual media output devices 110, 120, 130, 140 to increase or decrease the duration of playback for an individual video frame to slow or speed the playback time with respect to the reference time provided from the time values 141.

Buffer State Control

With respect to the buffer state of the output devices 110, 120, 130, 140, the controller output device 110 monitors the buffer state of each output device. Additionally, the controller output device 110 delays or otherwise adjusts output latency on individual output devices as a corrective or proactive measure. As an alternative or variation, the time and/or buffer control operations can be performed by the human interface device 108.

As an addition or alternative, the controller output device 110 can implement buffer control operations to implement corrective or proactive measures against the negative effects of one or more output devices failing to maintain synchronicity during output of a content item. In some embodiments, the controller output device 110 includes buffer control logic 115 to perform buffer control operations that include (i) monitoring the incoming media stream buffers of each output device 110, 120, 130 and 140, and (ii) issuing group buffer commands as a corrective or proactive measure for maintaining synchronized output.

In some embodiments, the controller output device 110 performs the buffer monitoring operations by repeatedly querying each output device 120, 130, 140 for a buffer data size value ("BDSV") 149 of the respective media stream buffer 125, 135, 145. The buffer data size value 149 can reflect a buffer size (e.g., an amount of buffered data, or an amount that can be buffered) of each media stream buffer 125, 135, 145 for the corresponding output device 120, 130, 140. For example, the buffer data size value 149 of each receiver output device 120, 130, 140 can be quantified as a number of bytes of media data. In another aspect, the buffer data size value 149 of each output device 120, 130, 140 can be based on the duration of media content output 159 which can be generated from the amount of buffered media data, such as calculated from bytes of data, sample rates, sample sizes or number of channels. Alternatively, each output device 120, 130, 140 can notify the controller output device 110 when the buffer data size value 149 of the respective media stream buffer 125, 135, 145 reaches a predetermined threshold. In this way, the data buffer data size value 149 of each output device 120, 130, 140 reflects a measure of the amount of data buffered in the incoming media stream buffers 125, 135, 145 of each output device 120, 130, 140. Additionally, the data buffer size values 149 of the output devices 120, 130, 140 can provide an indication that one or more of the output devices are not synchronized, or alternatively, an indication that one or more of the output devices 120, 130, 140 have drifted to a point where such output device(s) is or will soon sputter.

In some embodiments, the controller output device 110 includes the buffer control logic 115 to analyze the relative buffer data size values 149 of individual output devices 120, 130, 140. The buffer data size values 149 of the output devices 110, 120, 130 and 140 can be monitored over a duration of time when media content output 159 is generated. When the buffer control logic 115 of the controller output device 110 determines from the buffered data size values 149 that one of the receiver output devices 120, 130, 140 has a decreasing amount of buffered media data, then that receiver output device 120, 130, 140 can be identified as having run out of buffered data, meaning the output device will soon experience interrupted output (e.g., output device "sputtering"). When one output device 120, 130, 140 is deemed to have run out of buffered data, then a correction event can be triggered to replenish the media stream buffer 125, 135, 145 of that output device 120, 130, 140.

In some embodiments, the controller output device 110 can respond to the correction event by signaling or otherwise commanding the specific output device 120, 130, 140 to take a corrective action. For buffer control operations, the controller output device 110 can respond to the correction event by signaling other output devices 120, 130, 140 to adjust the respective generation of media content output 159 to compensate for the problematic receiving output device.

As an addition or variation, the controller output device 110 can respond to the correction event by signaling a group buffer control command 155 to each of the receiver output devices 120, 130, 140. The buffer control command 155 can be implemented to set a common buffer data size value 149 for the media stream buffers 125, 135, 145 on each of the receiver output devices 120, 130, 140. The controller output device 110 can also implement the buffer control command 155 on itself, to adjust the buffer data size value of its own media stream buffer (not shown).

In some embodiments, the buffer control logic 115 issues the buffer control command 155 to reset the media stream buffers 125, 135, 145 on each of the receiver output devices 120, 130, 140 as a corrective action for one of the receiver output devices 120, 130, 140 having run out of buffered data. The buffer control command 155 can be issued with the playback command 119, in order to uniformly implement a playback pause on each of the output devices 110, 120, 130, 140. The length of the pause can be measured by the duration for each of the output devices 110, 120, 130, 140 to reset their respective media stream buffers 125, 135, 145, so that the buffer data size value 149 of each respective media stream buffer is at a same relative or absolute buffer size. Once the buffer control logic 115 determines that each of the output devices 110, 120, 130, 140 have set the buffer data size value 149 of their respective media stream buffers 125, 135, 145 to a particular threshold, the buffer control logic 115 can issue another playback command 119 to each of the output devices 120, 130, 140 to resume playback on each of the output devices.

As another addition or variation, the buffer control logic 115 can issue the buffer control commands 155 to commonly after the buffer data size value 149 of the media stream buffers 125, 135, 145 on each output device 110, 120, 130, 140. In this way, the buffer control logic 115 can increase or decrease the latency of the media output. The determination to increase or decrease latency can be based on a variety of factors, such as (i) type or source for the media content data 143, (ii) available bandwidth on the network 101, and/or (iii) predictive determinations about individual output devices 110, 120, 130, 140 avoiding running out of data.

In more detail, media content data 143 from some sources can limit the desirability of latency. For example, latency for audio or video content of live or broadcast events is unwanted, as the audio output would lag, for example, an accompanying video content. Thus, the buffer control logic 115 can operate to detect when audio content is from a source that has an accompanying video element or otherwise reflects a live event. In such instances, the buffer control logic 115 can set the relative latency of the various output devices 120, 130, 140 to be a minimal (e.g., reduce value of the data buffer data size value 149 for each media stream buffer 125, 135 145). The determined minimal value for the buffer data size can further be based on the expectation that each output device 110, 120, 130, 140 can maintain an adequate buffer at least for some pre-determined duration.

In similar fashion, the buffer control logic 115 can operate to increase the latency (e.g., increase the data buffer size) of each output device 110, 120, 130, and 140. An increase to the buffer data size value 149 on the respective output devices 110, 120, 130, and 140 can be merited when, for example, the media content data 143 reflects recorded audio-only content (e.g., music file). One purpose for increasing the buffer data size value 149 can be to maintain a sufficient amount of buffered data on each output device 110, 120, 130, 140 so that none of the output devices can be expected to run out of data to a point where insufficient buffer exists. Optionally, when sufficient buffer exists on each output device 110, 120, 130, 140, the output devices can perform their own corrective actions, as described with various examples provided.

In some embodiments, the buffer size 149 on each output device 110, 120, 130, 140 can be adjusted by pausing each output device 110, 120, 130, 140. For example, the buffer data size value 149 of each media stream buffer 125, 135, 145 can be increased when the output devices 110, 120, 130, 140 are paused. Alternatively, the buffer size can be selected at the start once the audio content is selected.

While an example of FIG. 1 provides for one of the output devices 110, 120, 130, 140 to perform the buffer control operations, in variations, another device such as the human interface device 108 can implement the buffer control operations and issue the buffer control commands 155 for all of the output devices 110, 120, 130, and 140. For example, the human interface device 108 can include the buffer control logic 115, and use the buffer control logic 115 to implement buffer control commands 155 on each of the output devices 110, 120, 130, 140. In another variation, the system 100 can operate one of the output devices as the controller output device 110 for a given purpose (e.g., audio distribution, maintaining reference clock), and use the human interface device 108 for an alternative purpose (e.g., buffer control operations).

Figure 2A:
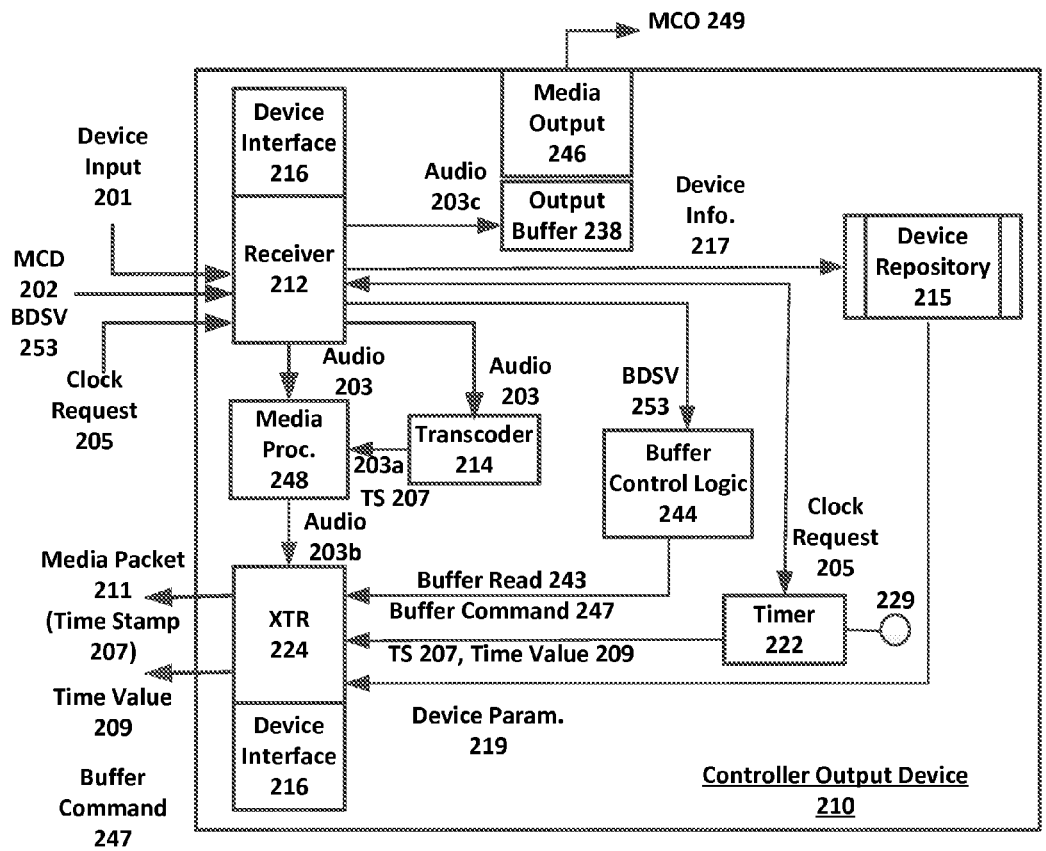
FIG. 2A illustrates an example of a controller output device, according to various embodiments.

FIG. 2A illustrates an example of a controller output device, according to various embodiments. With reference to FIGS. 1-2A, in some embodiments, controller output device 210 (which may correspond to the controller output device 110) includes a receiver 212, a device interface 216, a timer 222, and a transmitter (XTR) 224. Generally, the controller output device 210 can utilize the device interface 216 for purpose of communicating with other connected devices of the network 101. The device interface 216 can include logic integrated or otherwise provided with the receiver 212 and transmitter 224, for use when the controller output device 210 communicates with other similarly configured elements of the network 101. In some embodiments, the controller output device 210 utilizes the device interface 216 to establish itself with the other output devices (e.g., 120, 130, 140). The device interface 216 can enable the controller output device 210 to notify the other output devices (e.g., 120, 130, and 140) of the controller output device's 210 presence on the network 101. Further, the device interface 216 can receive device input 201 from the other output devices (or other components of the network 101). In some embodiments, an application protocol is implemented in which each output device communicates its presence, capability, and status to the other output devices. In this way, each of the output devices is aware of the other output devices on the network 101. In some embodiments, the controller output device 210 can store device information 217 in a device repository 215. The device information 217 can be utilized to determine, for example, device parameters 219 that affect a manner in which audio and other data is transmitted to the receiving output devices.

In operation, the controller output device 210 can receive media content data 202 as input from an external source. For example, the media content data 203 can be obtained from an Internet service (e.g., PANDORA, SPOTIFY, GOOGLE PLAY, NETFLIX, YOUTUBE, etc.). Alternatively, the media content data 203 can be communicated from another connected device, such as from a mobile computing device or tablet. In the latter example, a user can operate the computing device to select a local or network stored media file for output.

According to some embodiments, the controller output device 210 receives a clock request 205 from one or more of the receiver output devices. The clock request 205 can be used to trigger the timer 222 into providing a time value 209. In this way, the time value 209 is generated responsive to when the clock request 205 is received. The time value 209 is communicated via the transmitter 224 to the receiver output device (e.g., 250 in FIG. 2B, which may correspond to the output devices 120, 130, 140 in FIG. 1). The time value 209 provided in response to the clock request 205 enables the receiver output device 250 (e.g., refer to FIG. 2B) to determine an instance of synchronized time, from which additional synchronization operations and activities can be performed. The timer 222 can determine the time value 209 from an internal clock 229 of the controller output device 210, which can be maintained by the operating system or hardware component of the controller output device 210. In some variations, the timer 222 can determine the time value 209 from the access point 102 to which the controller output device 210 is connected.

According to some embodiments, the controller output device 210 receives and transmits media data to the receiver output devices (e.g., 120, 130, 140). In an example, the controller output device 210 receives the media content data 202 as input from a source (e.g., human interface device 108 of FIG. 1), and then re-transmits the media content data 202 as content data ("CD") 203 to the receiver output device 250. The content data 203 can correspond to or include audio data 203*a* or video data 203*v*. In some embodiments, the content data 203 is subjected to media processing component 248. The media processing component 248 can filter the media content data 203 into portions, such as into audio channels (when the output device is audio). More specifically, the output devices (e.g., 120, 130, 140) of the network 101 can be acoustically configured or otherwise arranged so that each output device outputs audio content for a particular channel. Accordingly, each receiver output device 250 can be assigned to a corresponding channel, and the media processing component 248 can transmit the filtered portions of the audio content 203*a* to the receiving output devices via the transmitter 224 and device interface 216.

Additionally, the controller output device 210 can itself generate media content output 249 (audio or video) from the content data 203 using a media output component 246. The media output component 246 can include a programmatic (or software) controlled electromechanical component for generating either sound or video in response to data input. When the content data 203 is audio, the generated media content output 249 on the controller output device 210 can also correspond to a portion of the audio content 203*a* assigned to a pre-determined channel. The controller output device 210 can include a media stream buffer 238, which in combination with the media output component 246, operates to generate the (audio or video) media content output 249 on the controller output device 210 using the content data 203.

In some variations, the controller output device 210 includes a transcoder 214. The transcoder enables an output of the controller output device 210 to be formatted or otherwise structured for transmission to a given one or more of the receiver output devices in accordance with capabilities of that receiving output device. The use of the transcoder 214 can be dictated by the device parameters 219 for the particular receiving output device. For example, the controller output device 210 can use the transcoder 214 to change the format of the content data 203 before retransmitting formatted content data 203*f* to the receiving output device 250. In some variations, the transcoder 214 can also be used to generate timestamps 207, especially if they are missing (or not provided) in the incoming media content data 202. The timestamps can be populated into the content data 203 for transmission from the controller output device 210.

The transmitter 224 can transmit media packets 211 to the receiver output device(s) 250, where the media packets 211 correspond to, or are based on, the media content data 202. The media packets 211 can include audio or video packets. The media packets 211 can be structured to include one or more timestamps 207, which are either a part of the original media content data 202 or populated in the media packets 211 by controller output device 210. By way of example, the timestamps 207 can signify when a song or audio file has started, so as to provide a form of state synchronization. The receiver output device 250 checks the time value 209 provided by the controller output device 210, which tells the receiver output device 250 at what time on the master clock to play the particular media packet 211 based on its associated timestamp 207. The timestamps 207 can also include in-stream timestamps, which are relative to the beginning of the stream. By way of example, the timestamps 207 can include in-stream stamps, which are conventionally provided for encoded audio to allow the audio to be synchronized with corresponding video. The timer 222 can provide the timestamp 207 in the media packets 211 before the transmitter 224 streams the media packets to the individual receiver output devices 250. Alternatively, timestamps 207 can be generated by the transcoder 214 as discussed above. As further described by examples provided below, the inclusion of the timestamps 207, in connection with a time reference such as determined from the time values 209, enables the output device receivers to play back the media content in synchronized fashion.

According to some embodiments, the controller output device 210 also implements buffer control logic 244. The buffer control logic 244 can signal buffer commands 247 via the transmitter 224 to each of the receiver output devices on the network. The buffer command 247 can include a buffer read operation ("BRO") 243 which can trigger the receiver output device 250 to return a buffer data size value 253 for the corresponding media stream buffer 125, 135, 145 (see FIG. 1). The buffer control logic 244 evaluates the buffer data size values 253 of each output device (including itself) to determine a buffer state for each respective media stream buffer 125, 135, 145. The buffer state can identify whether any of the connected receiver output devices 120, 130, 140 are failing to maintain adequate buffer size. If any of the receiver output devices 120, 130, 140 signal buffer data size values 253 that are below a threshold indicating imminent or existing buffer depletion, then the buffer control logic 244 signals the buffer command 247 to reset the media buffers of each of the other output devices that are outputting portions of the media content being outputted. The buffer command 247 can also be implemented on the media stream buffer 238 of the controller output device 210, so that the media buffer of each output device generating the media output content 249 can be reset to a same value at the same time.

In some embodiments, the buffer control logic 244 can implement the buffer reset for the various output devices, and further increase or decrease the size of the respective buffers based on various parameters. For example, the buffer control logic 244 can increase or decrease the size of the buffers for the output devices based on the source for the media content (e.g., live broadcast versus stored media).

Figure 2B:
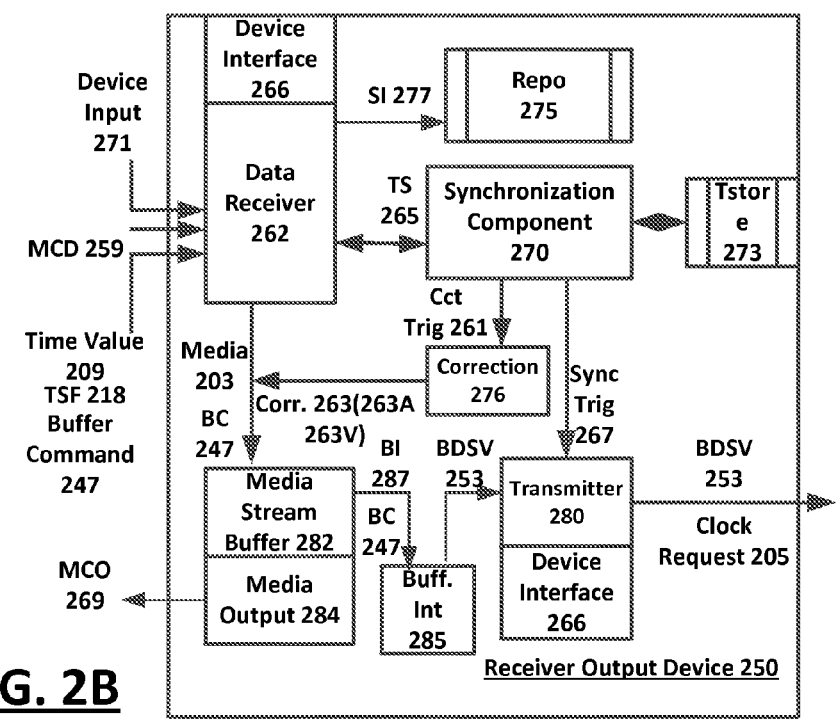
FIG. 2B illustrates an example of a receiver output device, according to various embodiments.

With reference to FIGS. 1-2B, in some embodiments, the receiver output device 250 includes data receiver 262, device interface 266, a synchronization component 270, a correction component 276, and a transmission component 280. The receiver output device 250 receives media content data 259 as input. The media content data 259 can be based on, or correspond to media packets 211 that are transmitted from the controller output device 210. Additionally, the receiver output device 250 includes a media stream buffer 282 and a media output component 284. The media stream buffer 282 and the media output component 284 can combine to generate a media content output 269 based on the media content data 259 that is received as input from the controller output device 210. The media output component 284 can correspond to, for example, an electromechanical component for generating sound in response to data input. In some embodiments, the media output component 284 can include a driver that is triggered by the data receiver 262.

The receiver output device 250 includes the device interface 266 to communicate with other connected devices of the network 101, including with the controller output device 210. The device interface 266 can include logic integrated or otherwise provided with the receiver 262 and transmission component 280 of the receiver output device 250 for when the receiver output device 250 communicates with other similarly configured elements of the network 101. As with the controller output device 210, the receiver output device 250 can utilize the device interface 266 in order to establish itself with the other output devices in the networked environment. The device interface 266 can enable the receiver output device 250 to notify other network components, including the other receiver output devices and the controller output device 210, of the receiver output device's 250 presence on the network 101. Additionally, the device interface 266 can receive device input 271 from other output devices that are connected on the network 101. In some embodiments, an application protocol is implemented in which the receiver output device 250, along with the other output devices of the network environment, communicates the receiver output device's 250 presence, capability, and status to each of the other output devices. This allows for the individual output devices of the network 101 to be aware of the other connected output devices on the same network. The receiver output device 250 can store system information 277 in a device repository 275.

In operation, the synchronization component 270 of the receiver output device 250 can implement operations in order to enable the receiver output device 250 to synchronize the generation of media content output 269 with media content output 249 of the controller output device 210 and other receiver output devices on the network 101. In some embodiments, the synchronization component 270 triggers 267 the clock request 205, which is communicated via the transmission component 280 to the controller output device 210. As described, the clock request 205 generates, as a response from the controller output device 210, the time value 209. The time value 209 corresponds to the current time, as perceived on the controller output device 210. The data receiver 262 receives the time value 209. The synchronization component 270 uses the time value 209 to determine a synchronized instance of time. The synchronized instance of time provides a reference for the receiver output device 250 in subsequent operations when media content output 269 is being generated.

According to some embodiments, the receiver output device 250 makes its own determination to whether correction is needed with regard to media content output 269, generated from input received from the controller output device 210 (media content data 259). Once the determination is made, the receiver output device 250 implements one or more corrective actions. In more detail, receiver output device 250 records a perceived time when the clock request 205 is transmitted to the controller output device 210 as t1, and a time t2 when the time value 209 is received. The receiver output device 250 computes the round-trip time (RTT) as being t2−t1. The receiver output device 250 can calculate a candidate current time Ts as Ts=T+RTT/2 (where T is provided by the time value 209). The receiver output device 250 either uses the candidate current time as the current time (Ts), or verifies that the existing current time is valid using the newly calculated current time (Ts). The verification that the existing current time is valid can be based on a determined margin of error. Whether verified or newly determined, the current time (Ts) represents the synchronized instance of time. The current time (Ts) can be stored in a time store 273 and used as a basis for the receiver output device 250 to perform synchronization actions during output of audio (or video) content transmitted from the controller output device 210.

In variations in which, for example, Timing Synchronization Function (TSF) 218 is obtained from the access point 102, the TSF 218 can be signaled from the controller output device 210 to the receiver output devices 250. Alternatively, the receiver output devices 250 can receive the TSF 218 directly from the access point 102. The receiver output devices 250 can detect the TSF 218 as a beacon, and the value provided by the TSF 218 does not need to be evaluated against network delays. Thus, some embodiments provide that RTT calculations are not needed when the TSF 218 is used. The synchronization component 270 can utilize the TSF 218 in determining the synchronized instance of time. Still further, in other variations, the controller output device 210 can act as an access point and broadcasts its own TSF 218 to the other receiver output devices. In this case, the receiver output devices 250 will connect via Wi-Fi to the controller output device 210 acting as the access point to retrieve the TSF 218. In such an implementation, the output devices can be connected using, for example, an Ethernet protocol, and the receiver output devices 250 can each access the TSF 218 of the controller output device while maintaining their other network connections.

When audio or video output is taking place, the data receiver 262 receives media content data 259 from the controller output device 210. As mentioned with other examples, when the receiver output device 250 is a speaker, the receiver output device 250 can implement audio output in an acoustically configured form, where, for example, each speaker in the network 101 outputs audio content for a particular channel. Further in context of audio output devices, some implementations provide for the media content data 259 to be filtered to reflect an audio channel that is assigned to the particular speaker. Alternatively, the receiver output device 250 can include a filter (not shown) to filter the incoming media content data 259 for the particular channel assignment.

As described, some of the audio frames that comprise the media content data 259 (communicated from controller output device 210) can include timestamps 265 (corresponding to timestamps 207 communicated from controller output device 210 within media packets 211). For example, a timestamp 265 can designate a start time for the output of audio content from a series of audio data frames. The timestamps 265 may be embedded or provided with individual audio frames received from the controller output device 210. In some embodiments, the data receiver 262 can detect and extract the timestamps 265. The synchronization component 270 can process the timestamps 265 in order to ensure that each data packet with a timestamp 265 is played back at the exact time specified by the timestamp 265, as measured using the synchronize instance of time. In order to enforce the output of the individual audio or video frames at the exact time specified by corresponding timestamps 265 (when applicable), the synchronization component 270 signals corrective actions 261 to the correction component 276. The correction component 276 can in turn take one or more corrective actions 263.

In some embodiments, the corrective actions 263 taken on the receiver output device 250 can be characterized by type and by differential time. The corrective actions 263 an also vary depending on whether the output devices 250 are for audio (corrective actions 263A) or video (corrective actions 263V). For example, the output devices 250 can include both audio and video output devices, and the corrective actions 263A, 263V can cause (i) the audio output from different sources to be synchronized with each other, and (ii) the video output to be synchronized with the audio output.

For corrections of audio output, corrective actions 263A can include those that momentarily slow down the receiver output device 250 relative to the incoming audio stream, or those that momentarily speed up the receiver output device 250 relative to the incoming audio stream. Additionally, the differential time can reflect a measurement of the amount of correction needed. For example, the corrective actions 263A can include (but are not limited to) (i) delaying use of an audio frame to generate a corresponding portion of the media content output by inserting filler audio, such as by repeating an audio frame, (ii) playing silence from the receiver output device 250, or (iii) skipping audio frames in the audio stream. Each of the number of audio frames that are repeated, a length of the silence in the audio output, or the number of audio frames skipped, can be based on the differential value. In some embodiments, the corrective actions 263A base the differential value on obtaining an output time for specific audio frames that are within an acceptable threshold from the perceived actual time during which those audio frames are to be played back. In other embodiments, the corrective actions 263A for the audio stream can correspond to resampling or filtering the audio stream to cause the delay or jump. Other corrective actions 263A can include, for example, slowing/accelerating the clock of the hardware to play the audio slower/faster, or doing signal processing to stretch/compress the audio signal.

For corrections of video output, corrective actions 263V can include manipulating a time period for when individual video frames are displayed on the video output device. Specifically, the time duration in which a single video frame is rendered can be (i) extended in order to slow the playback relative to synchronized reference clock, and (ii) shortened in order to increase the playback relative to the synchronized reference clock. By way of example, if the frame rate for the receiver output device 250 is 24 frames/second, the duration in which a single video frame is rendered is about 41.667 milliseconds without manipulation. The corrective action 263V can cause the duration to slow to 42 milliseconds or increase to 41 milliseconds in order to compensate and correct for the time differential caused by clock drift on the output device.

A buffer interface 285 can interface with the media stream buffer 282 in order to determine the buffer data size value ("BDSV") 253 for the media stream buffer 282. The media stream buffer 282 of the receiver output device 250 can output buffer information 287, reflecting the amount of buffered data and/or available space in the media stream buffer 282. The buffer information 287 can be used to generate the buffer data size value 253 of the media stream buffer 282. The buffer data size value 253 can quantify an amount of buffer in the media stream buffer 282 when a given media content output is being generated.

The buffer interface 285 can also receive and process buffer commands 247 in order to, for example, implement a pause or restart on the receiver output device 250. As shown with an example of FIG. 2A and FIG. 2B, the buffer commands 247 can be issued by, for example, the controller output device 210 in connection with buffer monitoring and control operations performed by the controller output device 210. In some embodiments, the buffer commands 247 can set the media stream buffer 282 so that the buffer data size value 253 is of a particular value, or of a specific minimum value. As described with another example, the buffer data size value 253 can be set to a threshold in connection with a determination made by the controller output device 210.

While examples of FIG. 2A and FIG. 2B illustrate controller output device 210 and receiver output device 250 separately, examples further provide for individual output devices (e.g., network connected speakers, television or video output device) to have the ability to have alternating roles within a networked environment. For example, the controller output device 210 can alternate as the receiver output device 250, and vice versa. Furthermore, depending on implementation, each of the controller output device 210 or receiver output device 250 can correspond to an audio, video or audio/video output device.

While example embodiments of FIGS. 1-2B provide for the receiver output devices 120, 130, 140 or 250 to receive audio or video content (and timing information) from the controller output device 110, 210, variations provide that the receiver output device can communicate directly with a source of the media content. For example, the receiver output device 250 can receive the audio content from a network service (e.g., PANDORA, SPOTIFY) and further receive time values 141, 209 from the controller output device 110, 210 respectively.

Figure 2C:
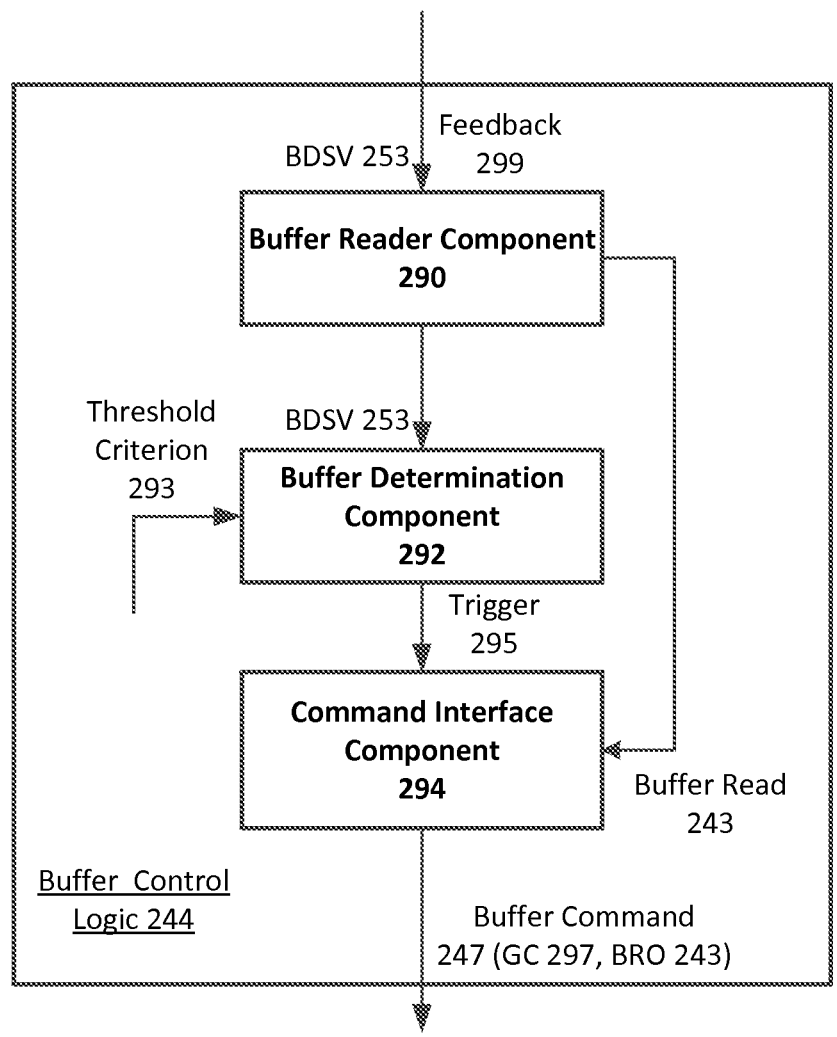
FIG. 2C illustrates buffer control logic, according to various embodiments.

FIG. 2C illustrates buffer control logic, according to one or more embodiments. With reference to FIGS. 1-2C, a buffer control logic 244 can be implemented on, for example, controller output device 210 (see buffer control logic 244 of FIG. 2A) or receiver output device 250. As an alternative, the buffer control logic 244 can be implemented on the human interface device 108 (see FIG. 1). For example, the buffer control logic 244 can be provided on the human interface device 108, which can implement some or all controller functions such as audio distribution. As a variation, the human interface device 108 can implement the buffer control logic 244 while another one of the speakers implements other controller functions such as audio distribution.

According to some embodiments, the buffer control logic 244 can include a buffer reader component 290, a buffer determination component 292 and a command interface component 294. The buffer reader component 290 can trigger buffer read operations 243 which can be communicated (e.g., via the command interface component 294) to trigger each receiver output device 120, 130, 140, 250 on the network 101 to transmit buffer data size values 253 for the media stream buffer 125, 135, 145, 282. The buffer reader component 290 can obtain the buffer data size values 253 during a time interval when audio or video is being outputted by the output devices of the network 101.

The buffer determination component 292 can compare the buffer data size values 253 of each output device 120, 130, 140, 250 with a threshold criterion 293. The comparison can serve to determine the buffer state of each receiver output device 120, 130, 140, 250. The buffer state identify whether any of the receiver output devices 120, 130, 140, 250 on the network 101 have depleted media stream buffers 125, 135, 145, 282. Such depletion can signal a possibility or occurrence of the particular output device 120, 130, 140, 250 sputtering or otherwise failing. While such an occurrence or event can be isolated to a problematic output device, an embodiment recognizes that absent intervention, the affected output device continues on indefinitely, resulting in an extended degradation in the quality of the media content output 159 generated from the collective set of output devices 110 120, 130, 140. Rather than allow for one buffer depleted output device to affect the media content output 159 from all of the output devices for the extended duration, the buffer determination component 292 can trigger 295 the command interface component 294 to generate buffer commands 247 to reset one or more of the output devices 110, 120, 130, 140. The buffer commands 247 can include group buffer commands 297 to reset all of the output devices 110, 120, 130, 140 on the network 101 at the same time. Additionally, the buffer commands 247 can also include the buffer read operation 243 to trigger the receiver output devices 120, 130, 140, 250 to return the buffer data size value 253.

In some embodiments, the command interface component 294 can issue the group command 297 or control input to each of the output devices 110, 120, 130, 140 on the network 101, for purpose of resetting the incoming media stream buffers 125, 135, 145, 282 of each of the respective output devices 120, 130, 140, 250. An initial set of buffer commands 297 can cause each output device 110, 120, 130, 140, 250 to pause for a duration needed to replenish the respective media stream buffer 125, 135, 145, 282 to a specific buffer data size value 149, 253. While the pause is in effect, the buffer reader 290 can receive feedback 299 from each output device 110, 120, 130, 140, 250 indicating the buffer data size value 253 of each respective output device while the pause is in effect. Once each output device 110, 120, 130, 140, 210, 250 is deemed to have a buffer data size value 149, 253 that exceeds the threshold criterion 293, the command interface component 294 issues the group command 297 to reset each output device 110, 120, 130, 140, 210, 250 to the point where the respective media content output 159 is paused. While the audio or video output may be temporarily interrupted, the sputtering of any buffer depleted output device can be eliminated.

Methodology

Figure 3:
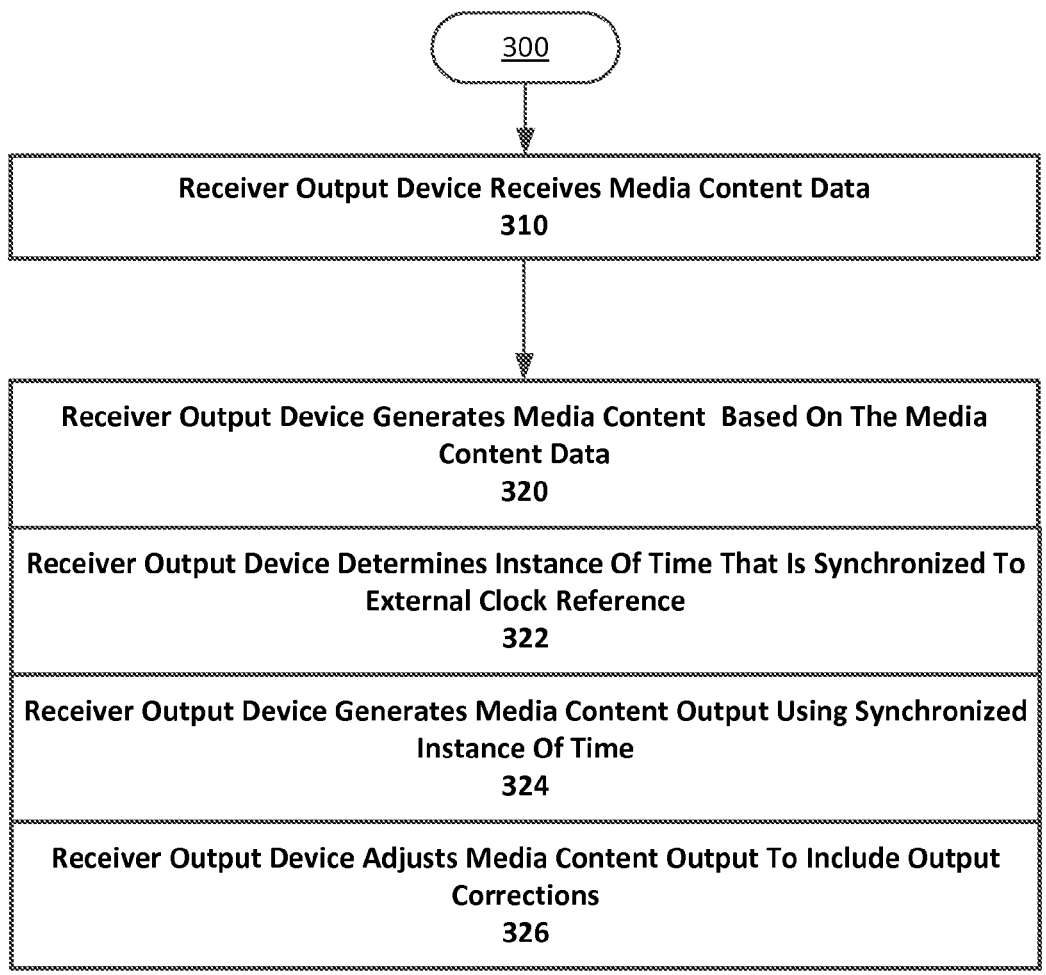
FIG. 3 illustrates an example method for synchronizing content on an output device, according to various embodiments.
Figure 4:
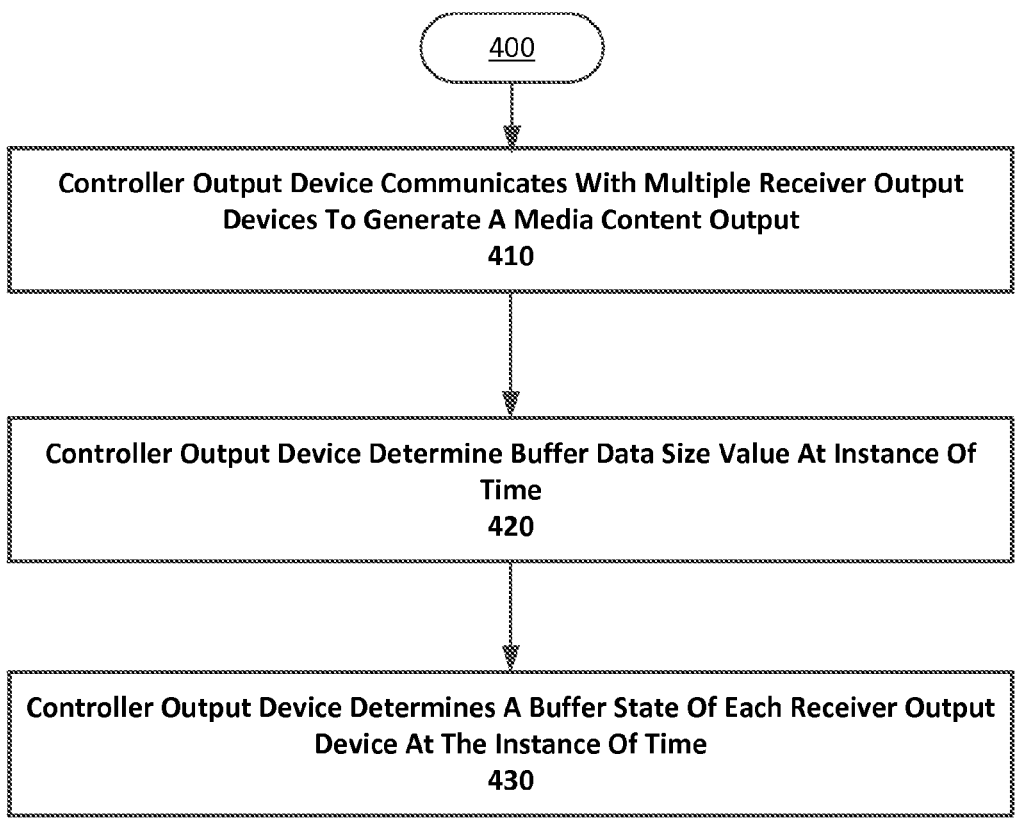
FIG. 4 illustrates an example method for implementing buffer control logic when controlling media content output generated from multiple output devices that are connected on a network, according to various embodiments.
Figure 5:
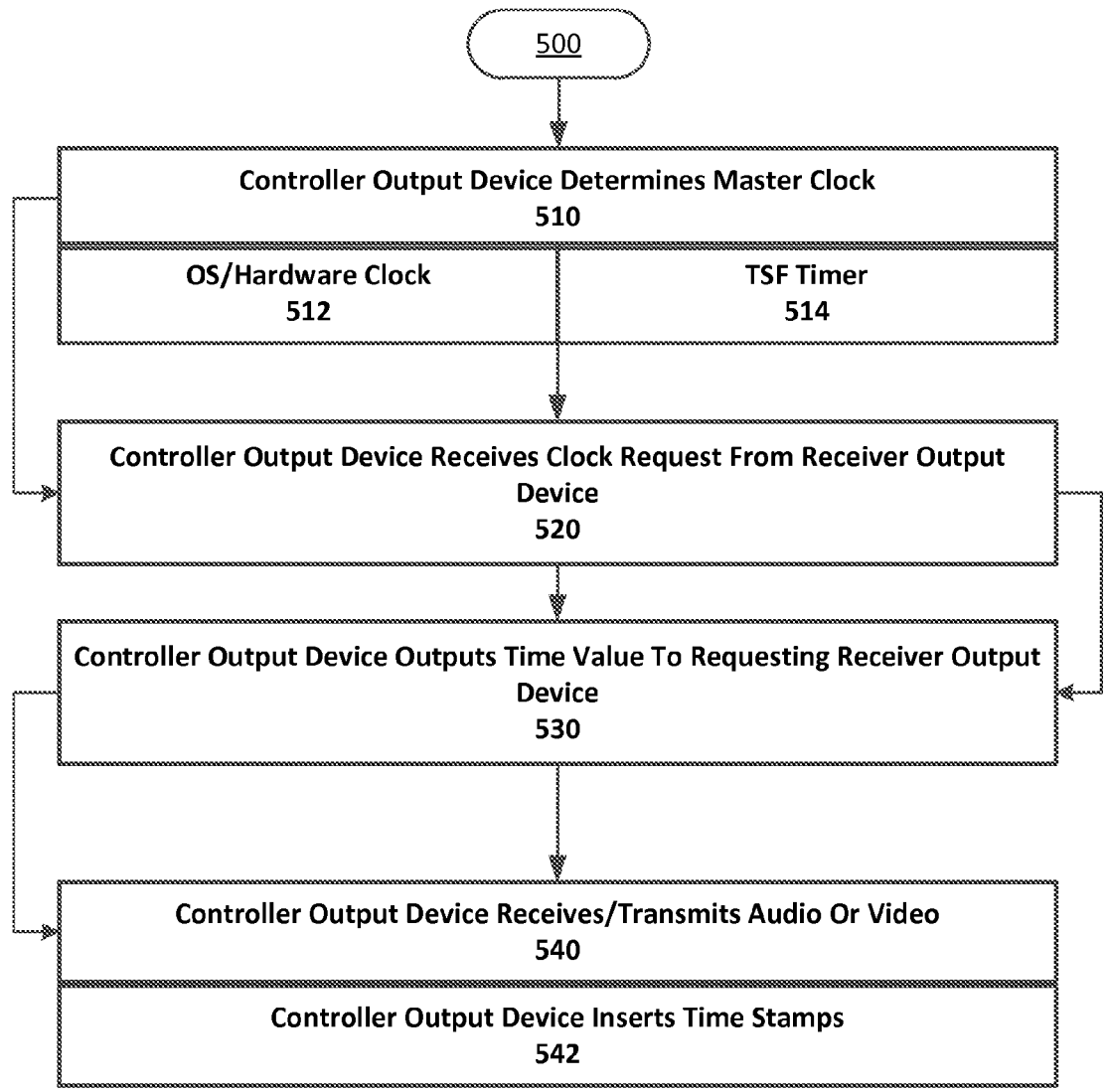
FIG. 5 illustrates an example method for transmitting time information along with content from a controller output device, for purpose of enabling one or more receiver output devices to synchronize output of the content, according to various embodiments.
Figure 6:
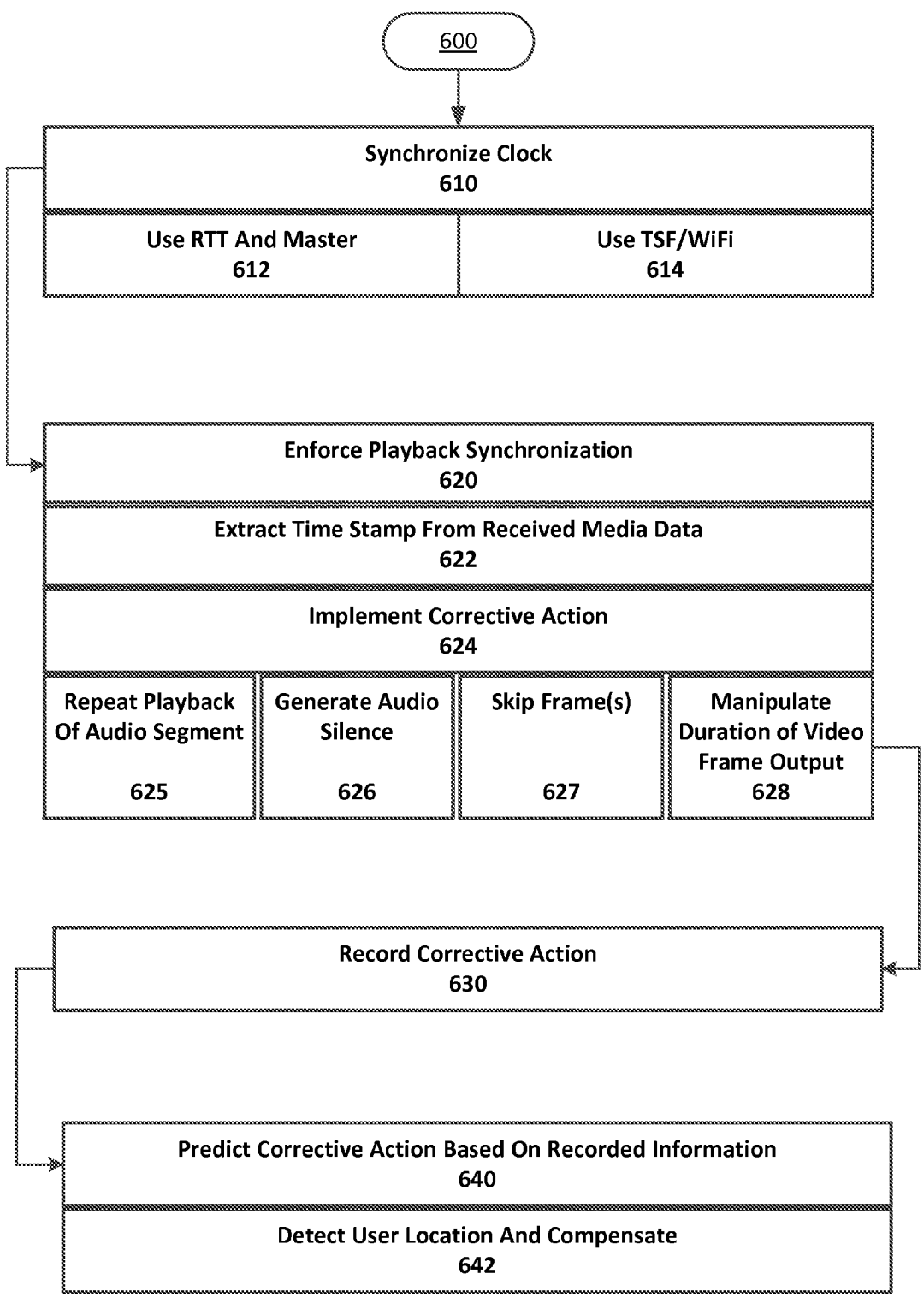
FIG. 6 illustrates an example method for receiving content from a controller output device, and for synchronizing output of a received audio or video content relative to a reference clock, according to various embodiments.
Figure 7:
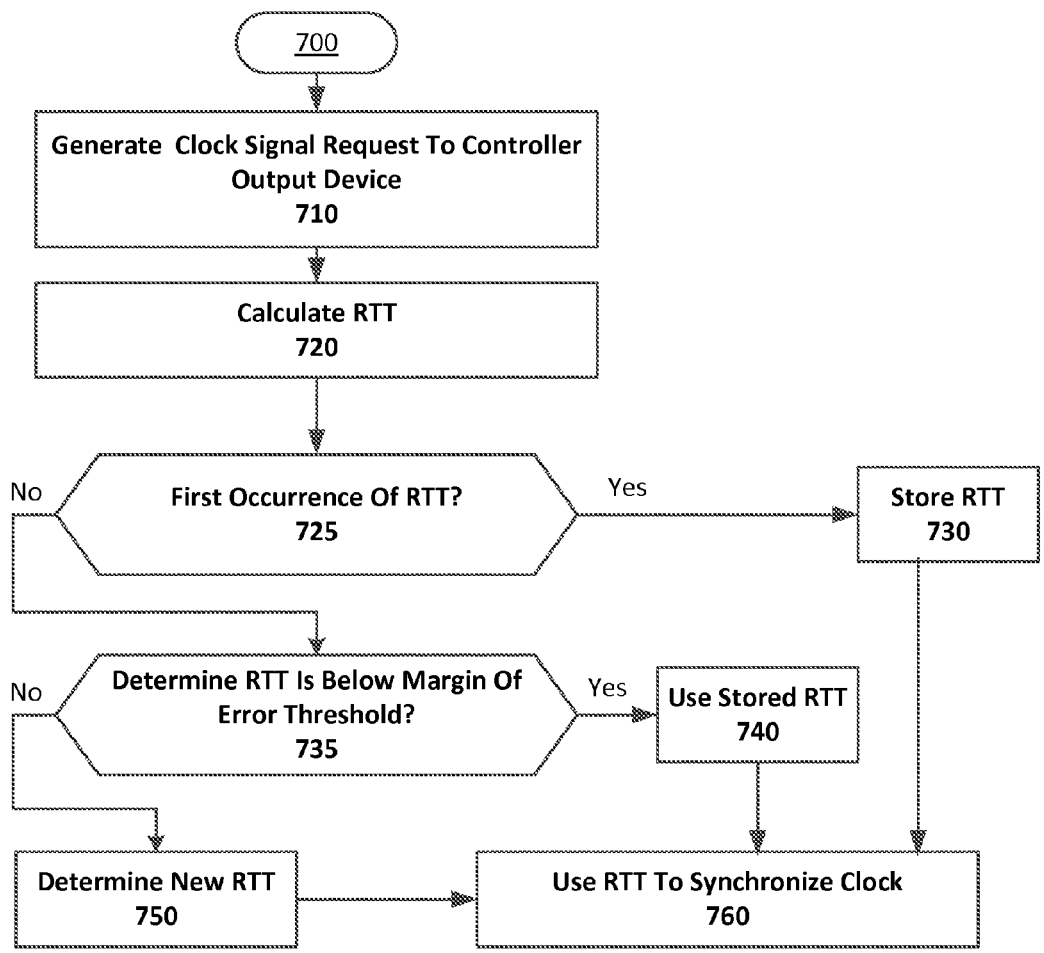
FIG. 7 illustrates an example method for a receiver output device to determine a synchronized instance of time as a reference for subsequent media output operations that are performed with other connected output devices, according to various embodiments.
Figure 8:
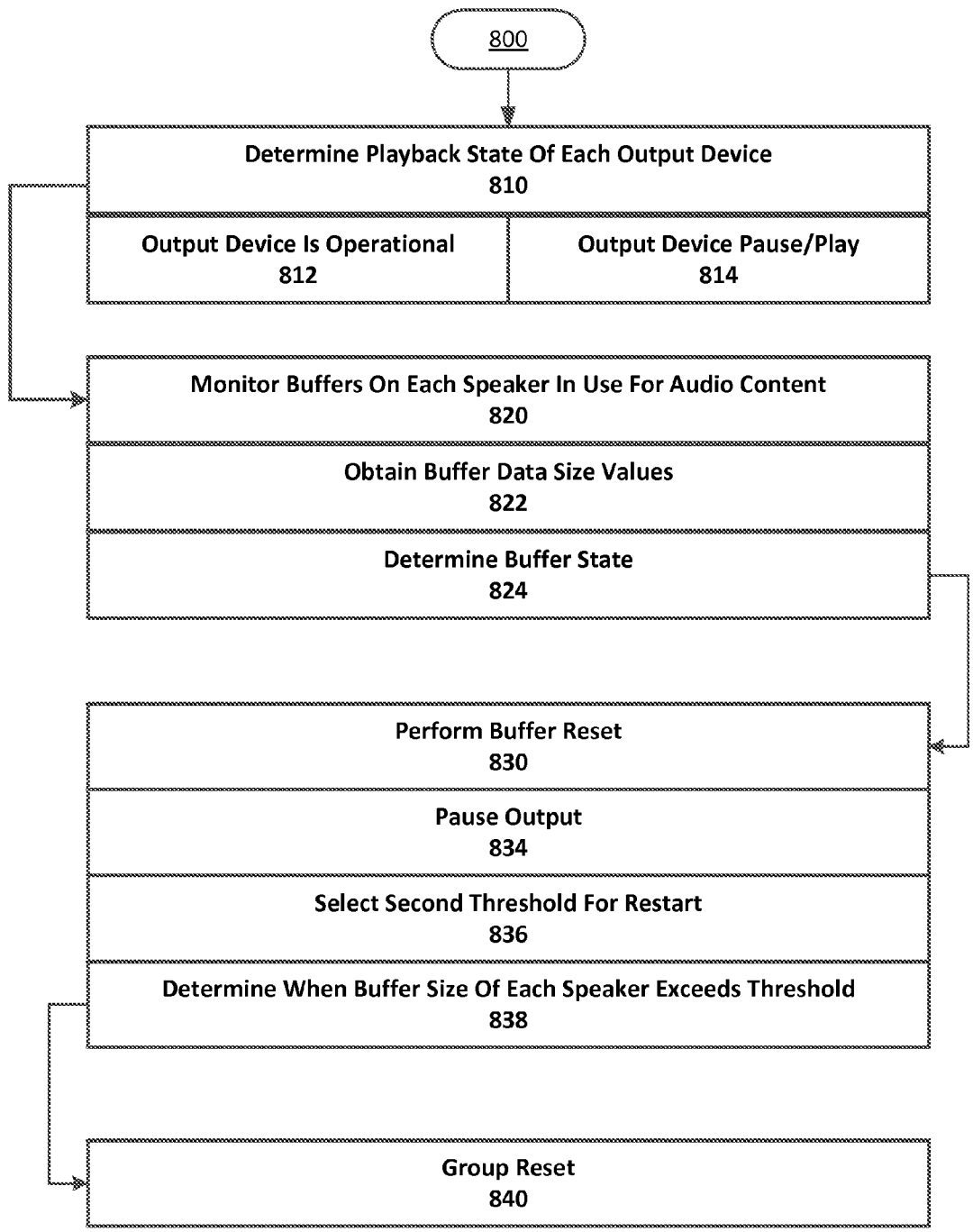
FIG. 8 illustrates an example method for implementing buffer control logic on a set of output devices on a network, according to various embodiments.

FIG. 3 illustrates an example method 300 for synchronizing content on multiple output devices that are connected on a network, according to various embodiments. FIG. 4 illustrates an example method 400 for implementing buffer control logic when controlling media content output generated from multiple output devices that are connected on a network, according to various embodiments. FIG. 5 illustrates an example method 500 for transmitting time information along with media content from a controller output device, for purpose of enabling one or more receiver output devices to synchronize their output, according to various embodiments. FIG. 6 illustrates an example method 600 for receiving media content from a controller speaker, and for synchronizing output of the received media content relative to a clock reference provided from the controller output device according to various embodiments. FIG. 7 illustrates an example method 700 for a receiver output device to determine a synchronized instance of time as a reference for subsequent synchronization operations performed on media content received from an another output device, according to various embodiments. FIG. 8 illustrates an example method 800 for implementing buffer control logic on a set of output devices on a network, according to various embodiments. Example methods such as provided by FIGS. 3 through 8 can be performed using components such as described with examples of FIGS. 1-2C. Accordingly reference may be made to elements of FIG. 1, FIG. 2A, FIG. 2B or FIG. 2C for purpose of describing suitable components for performing a step or sub-step being described.

With reference to FIGS. 1-3, receiver output device 250 receives media content data 143, 202 for a content item (310). The media content data 143, 202 can be received from a content source of network 101. In one example, the receiver output device 250 receives media content data corresponding to audio or video data from another device acting as the controller device.

The receiver output device 120, 130, 140, 250 can generate media content output 159, 269 for the content item based on the media content data 143, 202 (320). For example, the receiver output devices 120, 130, 140, 250 can generate media content output 159, 269 for audio and/or video based on a corresponding audio or video media content input.

While the receiver output device 250 generates the media content output 159, 269, the receiver output device 250 determines an instance of time that is synchronized to an external clock reference (322). The external clock reference can be determined using, for example (e.g., such as described with FIG. 7). Additionally, while the media content output is being generated, the receiver output device 120, 130, 140, 250 generates an output correction that is based at least in part on the synchronized instance of time (324). The receiver output device 120, 130, 140, 250 can implement audio or video corrections 263, depending on whether the generated media content output 159, 269 is audio or video. The receiver output device 120, 130, 140, 250 can then adjust the generated media content output 159, 269 to include the output correction 263 (326).

With reference to FIGS. 1-4, the controller output device 110, 210 communicates with multiple receiver output devices 120, 130, 140, 250 that are connected on the network 101 to generate a corresponding media content output 159, 269 (410). The controller output device 110, 210 monitors the respective media stream buffers 125, 135, 145 of each of the output receiver output devices 120, 130, 140, 250 in order to determine a buffer data size value 149, 253 of each media stream buffer 125, 135, 145 at a given instance of time (420). From the buffer data size value 149, 253, the controller output device 210 determines a buffer state of each receiver output device 120, 130, 140, 250 at that instance of time (430). The buffer state identify whether any of the receiver output devices 120, 130, 140, 250 on the network 101 have depleted media stream buffers 125, 135, 145, 282. For example, the buffer state can reflect whether any of the receiver output devices 120, 130, 140, 250 have buffer states that have failed, or about to fail, will likely fail or are in danger of failing, or which are not depleted. As described with an example of FIG. 8, the buffer control logic 244 can issue buffer commands 247 based on the buffer state that is determined for each output device 120, 130, 140, 250.

With reference to FIGS. 1-5, according to the method 500, the controller output device 110, 210 (e.g., audio speaker, television, etc.) determines a master clock (510). The master clock provides one example for a source of time values 141, 209, which can be communicated from the controller output device 210 to the receiver output devices 120, 130, 140, 250. In some embodiments, the master clock is determined from the operating system or from a hardware component of the controller output device 110, 210 (512). In a variation, the master clock is determined from the wireless access point 102 or network (514). The controller output device 110, 210 can, for example, obtain a Timing Synchronization Function (TSF) timer from an access point (e.g., 102) that utilizes and 802.11x protocol. Multiple receiver output devices 120, 130, 140, 250 can connect to the controller output device 110, 210 in order to receive time values 141, 209 corresponding to the TSF timer. In contrast to embodiments in which the controller output device 110, 210 obtains the master clock signal from the operating system, the use of the TSF timer may be an absolute reference. Each receiver output device 120, 130, 140, 250 can connect to controller output device 110, 210 to receive the TSF timer. In variations, an output device other than the one acting as the controller output device 110, 210 can serve as the access point 102 for purpose of communicating the TSF timer to other receiver output devices 120, 130, 140, 250 (e.g., speakers) of the network 101. In either case, one output device 110, 120, 130, 140 (e.g., speaker) can act as the access point 102 during a clock synchronization process involving multiple output devices, in which case multiple output devices connect to that device in order to receive the TSF timer. The output devices 110, 120, 130, 140 can exchange the TSF timer without interrupting the existing network connectivity, by way of utilizing a Multi-channel Concurrency (MCC) feature of the Wi-Fi network.

In some embodiments, the controller output device 110, 210 receives a clock request from a receiver output device 120, 130 140, 250 (520). In response to receiving the clock request, the controller output device 110, 210 outputs the time value 143, 209, corresponding to the current time as determined by the controller output device 110, 210 (530). In variations, the controller output device 110, 210 can output the TSF timer for the other receiver output devices 120, 130, 140, 250. The TSF timer can be communicated as a beacon, and not responsive to any request. The receiver output devices 120, 130, 140, 250 can also obtain the TSF timer directly from the access point 102.

Independent of communicating the time values 141, the controller output device 110, 210 can receive and transmit media content data 202, 259 to the receiver output devices 120, 130, 140, 250 of the network 101 (540). For example, the controller output device 210 can re-transmit incoming media streams from network services for output on multiple receiver output devices 120, 130, 140, 250 at the same time. In some embodiments, the controller output device 110, 210 can receive the media content data 202 as input from other sources such as an auxiliary input, a cable input or a Bluetooth module on the controller output device. In order to enable synchronization of the output of the media content data 259 by the various receiver output devices 120, 130, 140, 250, the controller output device 110, 210 can selectively provide timestamps with audio or video frames of the media content data 259 which is transmitted to the receiver output devices 120, 130, 140, 250 (542). The timestamps that are provided are relative to the start of the stream, and independent of the clock maintained by the controller output device 110, 210. For example, the controller output device 210 can provide a timestamp corresponding to a start time with a media content transmission.

With reference to FIGS. 1-6, according to the method 600, a receiver output device 120, 130, 140, 250 (e.g., 250) operates to synchronize an internal clock 610). In particular, the receiver output device 120, 130, 140 250 operates to determine a synchronized instance of time, from which comparisons or other time measurements can be made for purpose of synchronizing the generation of media content output generated by each the controller output device 110, 210 and receiver output devices 120, 130, 140, 250. Various synchronization sources can be used to enable the receiver output device 120, 130, 140,250 to synchronize. When multiple receiver output devices 120, 130, 140, 250 are used, the receiver output devices can synchronize their respective clocks using a same synchronization source. By way of example, the synchronization source can correspond to the controller output device 110, 210, a wireless access point 102, a specific receiver output device 120, 130, 140, 250 (designated as timekeeper), or a shared atomic clock.

In some embodiments, the synchronization source can correspond to the controller output device 110, 210, and the receiver output device 120, 130, 140, 250 uses an RTT measurement in order to determine the synchronized instance of time (612). The RTT measurement (e.g., refer to FIG. 7) can be obtained by the receiver output device 120, 130, 140, 250 transmitting a clock request 205 to the controller output device 110, 210, and the controller output device 110, 210 responding by transmitting back a time value 209. As an alternative or variation, the receiver output device 120, 130, 140, 250 can use a TSF timer (or other time value 143, 209) that is determined and communicated from, for example, the controller output device 110, 210 (614).

Each receiver output device 120, 130, 140, 250 can enforce output synchronization of audio or video content received from the controller output device 110, 210 (620). In some embodiments, the data receiver 262 of the receiver output device 120, 130, 140, 250 extracts timestamps from received audio or video frames (622). As described, the controller output device 110, 210 can selectively provide timestamps with one of audio or video frames that are then communicated to one or more receiver output devices 120, 130, 140, 250. In some embodiments, the inclusion of the timestamp into the audio/video frames indicates a specific time when the particular audio/video data frame is to be played back.

In enforcing synchronization, the receiver output device 120, 130, 140, 250 utilizes the synchronized instance of time to determine when the specific time for output of the audio/video frame occurs. If, without corrective action, the audio/video frame is scheduled to be played back at a time that differs from the specific time (as indicated by the time stamp) for output by more than a threshold, then corrective action 263A is implemented so that the media content output 159, 269 of the particular audio frame happens at a time that is specified by the time stamp, or within a threshold thereof (624). Different kinds of corrective actions 263 can be implemented for audio content 203a and video content 203v.

For audio output, the corrective action 263A can cause, for example, the receiving output device 120, 130, 140, 250 to slowdown or speed up the generated media content output 159, 269. In some embodiments, the receiver output device 120, 130, 140, 250 (operating as a speaker) repeats playback of an audio segment a number of times until the scheduled output time of the audio or video frame is within the threshold time provided by the time stamp (625). As an alternative (or in addition) to repeating an audio segment, the corrective action 263A can correspond to the receiving output device 120, 130, 140, 250 outputting silence for designated duration of time until the scheduled playback time of the audio frame is within the threshold time provided by the time stamp (626). As still another alternative (or in addition), the corrective action 263A can correspond to the receiving output device 120, 130, 140, 250 skipping audio frames (so as to catch up) (627). Either the duration of time or the number of audio frames affected by the corrective actions 263A can be based on the amount of time-drift or time-discrepancy as between the generation of the media content output 159, 269 (audio) amongst the receiver output device 120, 130, 140, 250 and the controller output device 110, 210.

For video output, the corrective action 263V can include manipulating the duration of time in which a video frame is rendered (628). More specifically, the duration of the video frame can be extended to slow down the playback on the respective receiver output device 120, 130, 140, 250 to meet the reference clock. Likewise, the duration of the video frame can be shorted to speed up the playback of the video to meet the reference clock. The corrective action 263V to the video output can be implemented in connection with corresponding corrective action 263A for the audio portion of the content item, which can be generated on another of the output devices on the network 101.

In some implementations, when corrective action 263 is taken, the corrective action is recorded for the particular output device 110, 120, 130, 140 (630). This information can be recorded in order to determine the general behavior or tendency of a particular output device 110, 120, 130, 140.

For example, if the corrective action 263 repeatedly requires that the receiver output device 250 either skip or duplicate audio frames, then the behavior of the speaker can be learned and anticipated. For example, multiple small corrections can be made in a given duration of time for a particular output device 110, 120, 130, 140, in response to recorded data indicating the a tendency of the output device to drift and require a larger overall correction in the given duration.

Accordingly, the need for corrective action 263 can be predicted based on the recorded information (640). Over a period of time, the recorded information can become fuller and more complete. This can allow for the corrective action 263 to be predicted in order to enforce synchronization on the audio or video output in advance and with more accuracy.

As another alternative or variation, the corrective action 263 taken can be adjusted or compensated for location of the user (642). With audio output in particular, the user's proximity to a speaker that is out of sync can actually have a positive effect of sounding in sync. Thus, user location can impact whether corrective action 263 is needed, and the type and degree of corrective action 263 which should be implemented. In order to determine the user location one example provides for a user handset (e.g., mobile device) to be used. Ultrasounds can be transmitted through the speakers and detected by the microphone of the handset. The handsets can communicate back to the speakers (or controller speaker) information indicating a time when the ultrasound marker was detected. Triangulation can be used to detect the range of the user from a particular location (e.g., speaker emitting ultrasound). The user's location can then be accounted for when determining the corrective action.

With reference FIGS. 1-7, according to the method 700, each receiver output device 120, 130, 140, 250 can generate the clock request 205 for the controller output device 110, 210 (710). Based on the response from the controller output device 110, 210, the receiver output device 120, 130, 140, 250 calculates the RTT (720). A determination is made as to whether the calculation of the RTT is a first occurrence in time for the particular receiver output device 120, 130, 140 250 at that session (725). If the calculation of the RTT is the first occurrence (725: Yes), the RTT is stored for subsequent usage (730). Else (725: No) another determination is made as to whether the RTT is below a margin of error threshold (735). If the RTT is above the margin of error (735: Yes), the stored RTT is used (740). Otherwise (735: No), a new RTT is determined (750). Using one of the stored RTT or new RTT, the clock on the receiver output device 120, 130, 140, 250 is synchronized for the output of the audio or video content received from the controller output device 110, 210 (760).

With reference to FIGS. 1-8, according to the method 800, the control output device 110, 210 can approximate a playback state of each output device 110, 120, 130, 140 on the network 101 (810). The playback state of each output device 120, 130, 140, 250 can reflect whether the output device is operational on the network 101 (812). Additionally, the playback state can reflect whether the output devices 110, 120, 130, 140, 210, 250 are in a state of providing playback, paused, or other playback state (814). Thus, for example, the output devices 110, 120, 130, 140, 210, 250 are synchronized in terms of the playback state, meaning that (i) if one output device is commanded to generate the respective media content output 159, 249, 269 all of the output devices output the media content (or the media content from the same source), and/or (ii) if a pause or change track command is processed on one output device 110, 120, 130, 140, 210, 250, it is processed in synchronized fashion on all of the output devices of the set.

Additionally, the buffer control logic 244 on the output device 210 can monitor the media stream buffers 125, 135, 145, 282 of each receiver output device 120, 130, 140, 210, 250 connected on the network 101 (820). The control output device 110 can read or otherwise obtain buffer data size values 253 for the media stream buffers 125, 125, 145 of each receiver output device 120, 130, 140, 250 in the network 101 at various instances while audio/video is being outputted (822). For example, the control output device 110, 210 can obtain the buffer data size values 253 for the media stream buffers 125, 135, 145, 282 of each output device at multiple instances during when the receiver output devices 120, 130, 140, 210, 250 generate media content output 159, 269 corresponding to a song and/or video presentation (e.g., movie).

The buffer data size values 253 can be used to determine the buffer state for each monitored output device. The buffer state can reflect the determination as to whether any of the monitored output devices 110, 120, 130, 140, 210, 250 have failed or will likely fail for lack of sufficient data (824). In particular, the monitored output devices 110, 120, 130, 140, 210, 250 can run out of buffered data, in which case the output from the device can be disrupted (e.g., audio device may "sputter"). For example, if one receiver output device 120, 130, 140, 250 has a buffer data size value 253 that is less than a threshold level, then that output device can be deemed to be in a state of failure. Alternatively, the control output device 110 can predict that one or more of the receiver output devices 120, 130, 140, 250, will fail from not receiving sufficient data. In one implementation, the control output device 110 takes multiple readings of the media stream buffers 125, 135, 145, 282 for each receiver output device 120, 130, 140, 250 over a given duration of time. The buffer data size values 253 on each receiver output devices 120, 130, 140, 250 can be indicative of a trend towards failure. For example, if the buffer data size values 149, 253 of only one receiver output device 120, 130, 140, 250 is slowly getting less than that of the other output devices that remain constant, then the particular output device can be anticipated to fail (e.g., start sputtering) at an interval in the future. The determination of a trend based on the buffer data size values 149, 253 for the respective receiver output devices 120, 130, 140, 250 enables the controller output device 110, 210 to be proactive in maintaining the quality of the media content output 159, 269 generated on the network 101 by the receiver output devices.

When failure is detected or anticipated, a buffer reset may be performed (830). The buffer reset can be implemented by the control output device 110 for example, issuing a command for all output devices 110, 120, 130, 140 to pause output (834).

The control output device 110, 210 can select a second threshold for determining when to reset the respective receiver output devices 120, 130, 140, 250 (836). In some variations, the second threshold can be selected to increase or decrease the latency of the audio or video output. For example, the controller output device 110 can select to increase the latency (or buffer time) for the receiver output devices 120, 130, 140, 250 when the media content data 143, 202 is recorded media, and the control output device 110, 210 can select to decrease the latency for receiver output devices 120, 130, 140, 250 when the media content data 143, 202 is live or broadcast media. Likewise, the latency of receiver output devices 120, 130, 140, 250 can be matched to video output for when the output devices include both audio and video devices. The presence of video can be determinative of the amount of buffering that can be done on the output devices, as the audio and video devices are synchronized for best user experience. If there is live video, for example, there may be a limit to the amount of buffering that can be done. But if there is recorded movie playback, for example, the size of the media stream buffer 125, 135, 145, 282 for the corresponding output device 120, 130, 140 can be determinative of the buffer data size value 149, 253 for the media stream buffers 125, 135, 145, 282 of the other output devices 120, 130, 140.

While paused, the buffer size of each output device is obtained from the various output devices 110, 120, 130, and 140 on the network 101 (838). Once the buffer data size value 149, 253 for each output device 110, 120, 130, 140, 210, 250 is at a second threshold, the respective output devices can reset (840).

While an example of FIG. 8 provides for performing the buffer reset in response to detection or anticipation of failure, some variations provide that a buffer reset can be performed selectively in response to other events, such as in response to when the type or source of content is changed. For example, the control output device 110 (operating as a speaker) can signal a buffer reset when the user selects to switch the source of the media output from recorded media to television or other content which includes video. Upon this change being detected (e.g., by user input or through programmatic detection at output device 110), the current audio/video can be paused until the media stream buffer 125, 135, 145 of each output device 110, 120, 130, 140 has a buffer data size value 149, 253 that exceeds the designated threshold, at which point the audio and video output devices start at the same time.

Computer System

Figure 9:
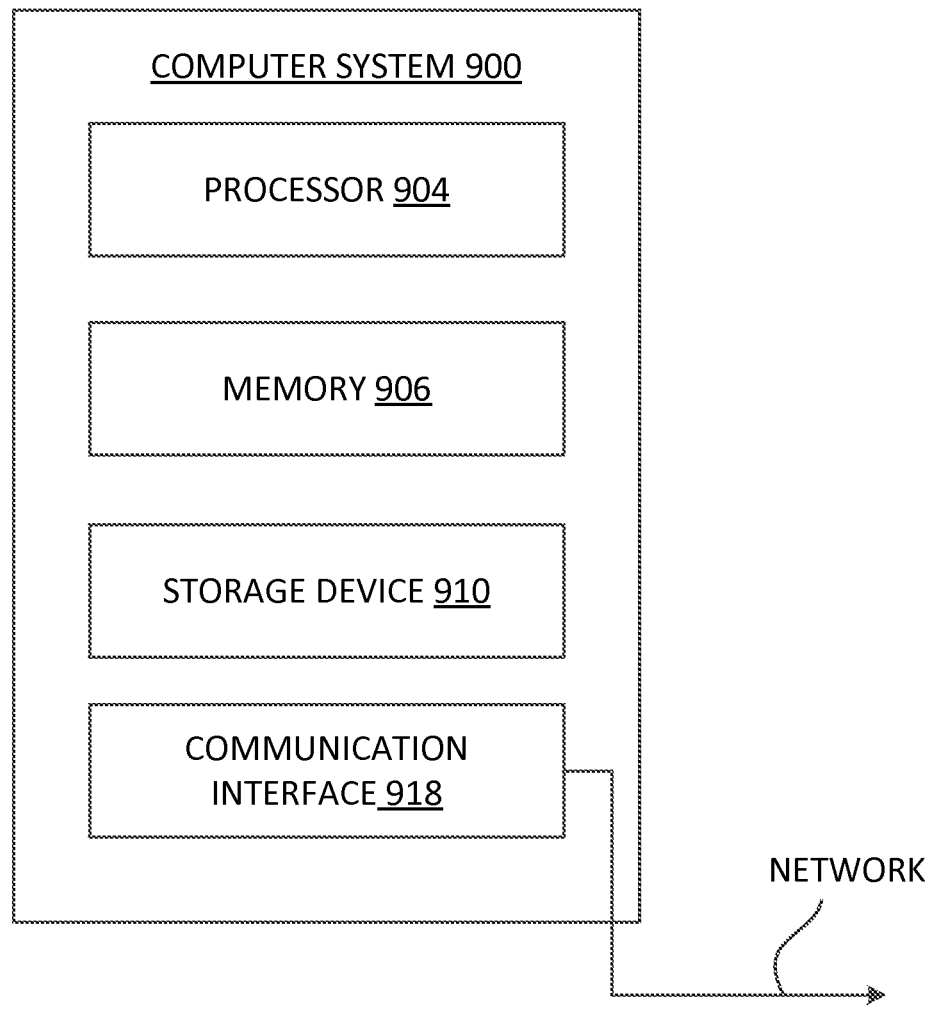
FIG. 9 is a block diagram that illustrates a computer system upon which various embodiments may be implemented.

FIG. 9 is a block diagram that illustrates a computer system upon which embodiments described herein may be implemented. For example, in the context of FIG. 1 and FIG. 2A, FIG. 2B and FIG. 2C, each of the controller output device 110, 210 or receiver output devices 120, 130, 140, 250 can be implemented using one or more computer systems such as described by FIG. 9.

With reference to FIGS. 1-9, in some embodiments, computer system 900 includes processor 904, memory 906 (including non-transitory memory), storage device 910, and communication interface 918. The computer system 900 includes at least one processor 904 for processing information. The computer system 900 also includes the memory 906, such as a random access memory (RAM) or other dynamic storage device, for storing information and instructions to be executed by the processor 904. The memory 906 also may be used for storing temporary variables or other intermediate information during execution of instructions to be executed by the processor 904. The computer system 900 may also include a read only memory (ROM) or other static storage device for storing static information and instructions for the processor 904. The storage device 910, such as a magnetic disk or optical disk, is provided for storing information and instructions. The communication interface 918 may enable the computer system 900 to communicate with one or more networks through use of a network link (wireless or wireline).

In some embodiments, the memory 906 may store instructions for implementing functionality (e.g., as described with an example system of FIG. 1), computing devices (e.g., as described with examples of FIG. 2A, FIG. 2B and FIG. 2C), or methods (e.g., as described with examples FIG. 3 through FIG. 9). Likewise, the processor 904 may execute the instructions in providing functionality (e.g., as described with an example system of FIG. 1), computing devices (e.g., as described with examples of FIG. 2A, FIG. 2B and FIG. 2C), or methods (e.g., as described with examples FIG. 3 through FIG. 9).

Embodiments described herein are related to the use of computer system 900 for implementing the techniques described herein. According to some embodiments, those techniques are performed by the computer system 900 in response to the processor 904 executing one or more sequences of one or more instructions contained in the memory 906. Such instructions may be read into the memory 906 from another machine-readable medium, such as the storage device 910. Execution of the sequences of instructions contained in the memory 906 causes the processor 904 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for operating a controller output device to synchronize network content, the method comprising:
    communicating with multiple output devices that are connected via a network to output the network content;
    monitoring, from over the network, a buffer size of a respective media stream buffer on each of the multiple output devices, each media stream buffer storing at least a portion of the network content on the respective output device;
    detecting that the buffer size of the media stream buffer on a first output device of the multiple output devices is below a first threshold; and
    adjusting the network content output by a second output device of the multiple output devices when the buffer size of the first output device is below the first threshold.

2. The method of claim 1, wherein the detecting includes determining that the first output device has failed.

3. The method of claim 1, wherein the detecting includes predicting that the first output device is expected to fail.

4. The method of claim 1, wherein the buffer sizes indicate a synchronization state of the multiple output devices, and wherein the method further comprises detecting when the network content outputs of two or more of the multiple output devices are not synchronized based at least in part on the buffer sizes of the multiple output devices.

5. The method of claim 1, wherein the adjusting is to synchronize the network content outputs of the multiple output devices.

6. The method of claim 1, wherein the adjusting includes adjusting the buffer size of the media stream buffer on each of the multiple output devices.

7. The method of claim 1, wherein the adjusting includes resetting the media stream buffer on each of the multiple output devices.

8. The method of claim 1, wherein the adjusting includes altering a latency of the network content output from each of the multiple output devices.

9. The method of claim 8, wherein the altering comprises increasing the latency of the network content output from each of the multiple output devices if the content corresponds to recorded audio content.

10. The method of claim 8, wherein the altering comprises decreasing the latency of the network content output from each of the multiple output devices if the content corresponds to a live event or has accompanying audio or video content.

11. The method of claim 8, wherein the altering is based on at least one of a source of the content, an available bandwidth of the network, or predictive determinations about the buffer sizes of the multiple output devices.

12. The method of claim 1, wherein the controller output device is one of the multiple output devices.

13. The method of claim 1, wherein the method further comprises transmitting audio or video data corresponding to the content from the controller output device to at least some of the multiple output devices.

14. The method of claim 1, wherein the controller output device is configured to communicate with the multiple output devices using wireless peer-to-peer connections.

15. A controller output device comprising:
a memory that stores a set of instructions;
one or more processors that execute the instructions to:
communicate with multiple output devices that are connected via a network to output media content;
monitor, from over the network, a buffer size of a respective media stream buffer on each of the multiple output devices, each media stream buffer storing at least a portion of the media content on the respective output device;
detect that the buffer size of the media stream buffer on a first output device of the multiple output devices is below a first threshold; and
adjust the media content output by a second output device of the multiple output devices when the buffer size of the first output device is below the first threshold.

16. The controller output device of claim 15, wherein execution of the instructions to detect that the buffer size of the first output device is below a first threshold causes the one or more processors to determine that the first output device has failed.

17. The controller output device of claim 15, wherein execution of the instructions to detect that the buffer size of the first output device is below the first threshold causes the one or more processors to predict that the first output device is expected to fail.

18. The controller device of claim 15, wherein the buffer size indicates a synchronization state of the multiple output devices, and wherein execution of the instructions further causes the one or more processors to detect when the media content outputs of two or more of the multiple output devices are not synchronized based at least in part on the buffer sizes of the multiple output devices.

19. The controller output device of claim 15, wherein execution of the instructions to adjust the media content output from each of the multiple output devices causes the one or more processors to synchronize the media content outputs of the multiple output devices.

20. A non-transitory computer-readable medium that stores instructions, which when executed by one or more processors of a computing device, cause the computing device to perform operations comprising:
communicating with multiple output devices that are connected via a network to output network content;
monitoring, from over the network, a buffer size of a respective media stream buffer on each of the multiple output devices, each media stream buffer storing at least a portion of the network content on the respective output device;
detecting that the buffer size of the media stream buffer on a first output device of the multiple output devices is below a first threshold; and
adjusting the network content output by a second output device of the multiple output devices when the buffer size of the first output device is below the first threshold.

* * * * *